United States Patent [19]

Hayward

[11] Patent Number: 4,560,928
[45] Date of Patent: Dec. 24, 1985

[54] VELOCITY OR DISTANCE MEASURING APPARATUS USING MAGNETIC DIPOLES

[75] Inventor: Ian Hayward, Blythe, England

[73] Assignee: British Gas Corporation, London, England

[21] Appl. No.: 642,714

[22] Filed: Aug. 22, 1984

Related U.S. Application Data

[63] Continuation of Ser. No. 330,473, Dec. 14, 1981, abandoned, which is a continuation of Ser. No. 231,354, Feb. 4, 1981, abandoned, which is a continuation of Ser. No. 67,018, Aug. 16, 1979, abandoned.

[30] Foreign Application Priority Data

Jan. 5, 1979 [GB] United Kingdom ............... 7900475

[51] Int. Cl.$^4$ ........................... G01P 3/50; G01B 7/14
[52] U.S. Cl. .................................... 324/172; 324/171; 324/207; 340/670
[58] Field of Search ............................. 324/171–174, 324/178, 179, 206–208, 219, 220, 166; 246/63 R, 182 R; 340/47, 670

[56] References Cited

U.S. PATENT DOCUMENTS

| | | | |
|---|---|---|---|
| 2,576,424 | 11/1951 | Sunstein | 246/63 R |
| 3,066,253 | 11/1962 | Bowers | 324/206 X |
| 3,215,932 | 11/1965 | Sims et al. | 324/179 |
| 3,786,684 | 1/1974 | Wiers et al. | 324/220 X |
| 3,862,497 | 1/1975 | Vernooy | |
| 3,873,912 | 3/1975 | Mori et al. | 324/206 |
| 3,899,734 | 8/1975 | Beaver et al. | 324/220 |
| 4,093,917 | 6/1978 | Haeussermann | 324/173 |
| 4,135,155 | 1/1979 | Kehl et al. | 324/178 |

FOREIGN PATENT DOCUMENTS

| | | |
|---|---|---|
| 2164312 | 6/1973 | Fed. Rep. of Germany ...... 324/179 |
| 1549170 | 9/1966 | France . |
| 2203148 | 5/1974 | France . |
| 1170699 | 11/1969 | United Kingdom . |
| 1173379 | 12/1969 | United Kingdom . |
| 1237728 | 6/1971 | United Kingdom . |
| 1257678 | 12/1971 | United Kingdom . |
| 1283357 | 7/1972 | United Kingdom . |
| 1310586 | 3/1973 | United Kingdom . |
| 1320903 | 6/1973 | United Kingdom . |
| 1361478 | 7/1974 | United Kingdom . |

*Primary Examiner*—Gerard R. Strecker
*Attorney, Agent, or Firm*—Watson Cole Grindle & Watson

[57] ABSTRACT

A non-contact system suitable for measuring velocity/distance of an object travelling inside a ferromagnetic pipeline utilizes magnetic dipoles written into the pipe surface by a transmission coil. These dipoles can be detected by a magnetic detector situated a fixed distance from the transmission point. If the time taken for a dipole to travel from the transmitter to the detector is recorded then this time will be proportional to the velocity of the system. The system functions both as a velocity measurement device and as a distance marker.

Once the system detects a dipole it requests a further imprint, hence, a constant spacing is maintained between dipoles equal to the spacing between transmitter and detector.

9 Claims, 11 Drawing Figures

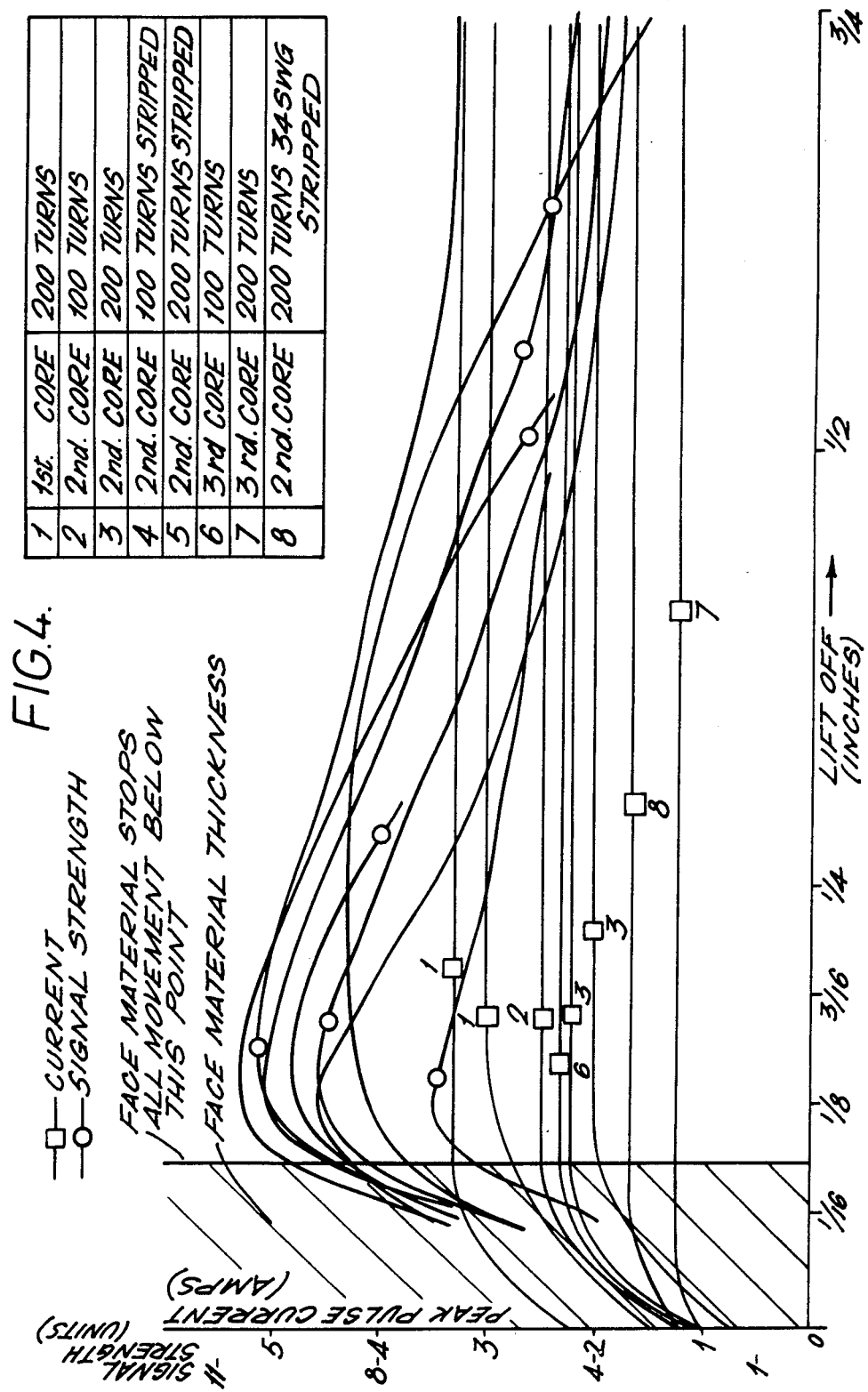

VELOCITY OR DISTANCE MEASURING APPARATUS USING MAGNETIC DIPOLES

This application is a continuation of application Ser. No. 330,473, filed Dec. 14, 1981, which is a continuation of Ser. No. 231,354, filed Feb. 4, 1981, which is a continuation of Ser. No. 067,018 filed Aug. 16, 1979, all now abandoned.

BACKGROUND OF THE INVENTION

The invention relates to instrumentation for measuring velocity and/or distances and, in particular, relates to instrumentation for measuring the velocity or distance, or both, of an inspection vehicle travelling inside a ferromagnetic pipeline.

It is known to use mechanical devices to measure distances or velocities. Such mechanical devices work by reason of contact between the vehicle and the static surface over which it is moving usually by means of a wheel. However, mechanical devices suffer for inaccuracies owing to slippage or skidding of the contacting surface or to bouncing off the surface.

The present invention seeks to provide a system for measuring velocities and distances wherein the measuring apparatus does not physically contact the surface over which it is travelling.

SUMMARY OF THE INVENTION

In accordance with the present invention there is provided a measuring system comprising:
(i) a transmitter for implanting a magnetic dipole on a ferromagnetic surface;
(ii) a detector remote for the transmitter for detecting an implanted magnetic dipole and including a bridged system of magneto diodes with the magneto diodes corresponding with and matching the spatial geometry of the implanted magnetic dipole;
(iii) means for triggering the transmitter, the triggering means being responsive to an output signal from said detecting means upon detecting an implanted magnetic dipole, and
(iv) means for measuring and representing the time elapsed between the time the dipole is implanted and subsequently detected.

BRIEF DESCRIPTION OF THE FIGURES

The above objects, advantages and features of the invention are apparent from the following description of a preferred embodiment of the invention when taken in conjunction with the drawings, wherein:

FIG. 4 is a graph showing the signal strength vs. lift-off characteristics for a number of transmission cores;

DETAILED DESCRIPTION OF THE INVENTION

Figure 1:
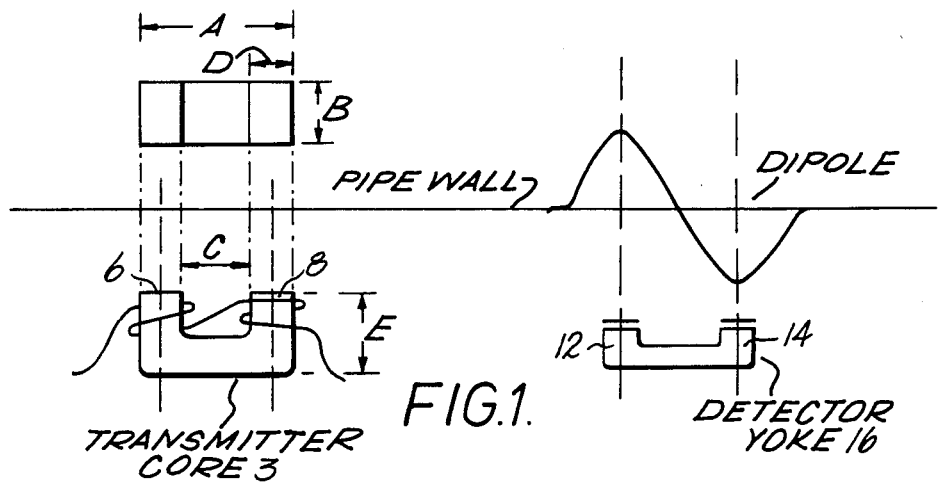
FIG. 1 shows the spatial relationship between the transmitter and detector elements, and a pipe wall, and also illustrating a typical signal output from the detector upon detection of an implanted dipole.

The basic unit of the system is shown in FIG. 1 and consists of a 'u' shaped transmitter core 3 wound with, for example, enamelled wire 4. Current pulses are fed to the transmitter coil, for example, from a fifteen volt transistor pulsing circuit (FIG. 7), the peak value of each pulse being dependent on the gap between the limb faces 6, 8 and the pipe surface 10 for any fixed coil arrangement.

The detector is preferably in the form of a full bridge with each arm containing a magneto diode. Each pair of diodes is attached to the limbs 12, 14 of a 'u' shaped metal detector yoke 16, the yoke's purpose being to complete the magnetic circuit in the vicinity of the pipe wall, the spatial separation of the diodes correlating with the geometry of the imprinted dipole, as shown in FIG. 1.

The detector signals are processed in real time; signals from the bridge are band limited then subtracted. The resulting signal, after amplification, being used to calculate velocity, indicate distance and request a further pulse.

Figure 2:
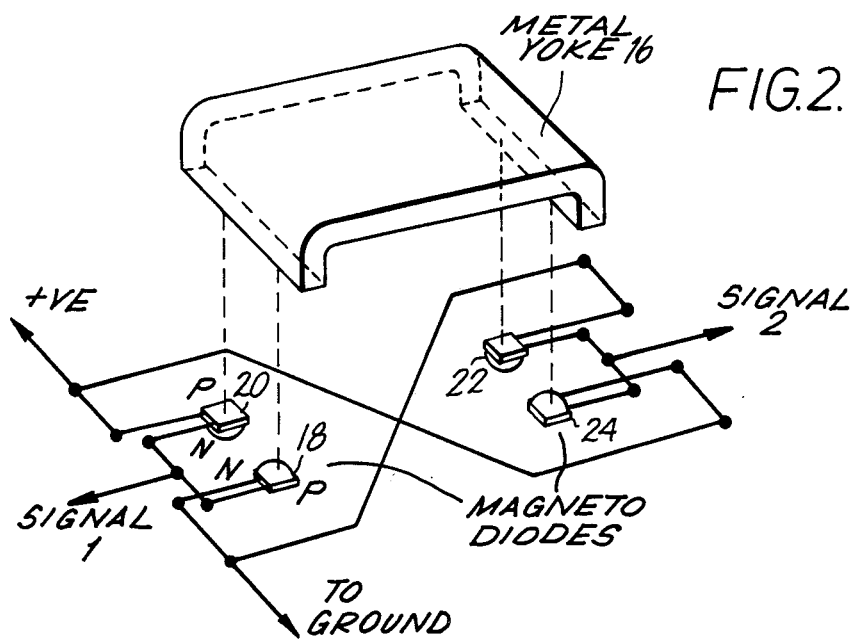
FIG. 2 is an exploded view of a bridged system of magneto diodes and the relationship thereof with a metal yoke.
Figure 3:
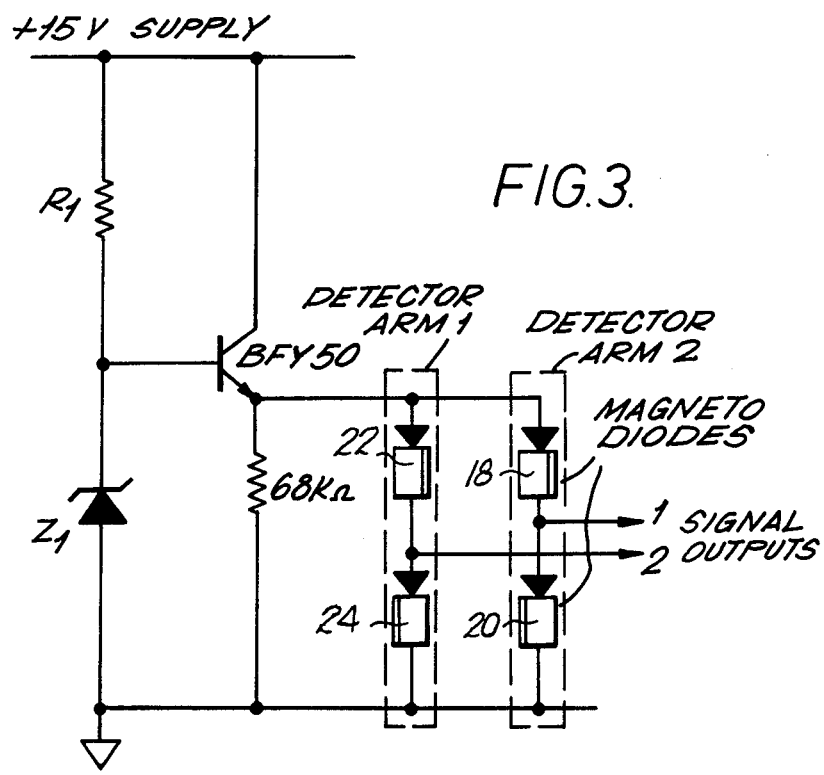
FIG. 3 shows the manner in which a bridged system of diodes of the invention is connected to a simple regulated power supply using a Zener diode.

In a preferred form of the invention the detector is formed by four magneto diodes 18, 20, 22 and 24 in a bridge configuration cemented to a 'u' shaped metal yoke 16 with dimensions as outlined in FIG. 2. The power supply to the detector is taken from a simple regulator circuit maintaining approximately six volts across the diode pairs, as shown in FIG. 3, which also illustrates the electrical bridge connection of the magneto diodes 18, 20, 22 and 24, to provide two signal outputs.

It has been found that output signal variations were due more to the changing characteristics of magnetodiodes than to changes in yoke materials, but did show a dependence on detector width. The optimum width obviously depends on transmitter core dimensions, but the trend showed an improvement in signal strength with widths up to approximately 200% of the transmitter core width; with widths much larger than this signal strength deteriorates.

The two detector signals are not identical. One signal tends to a monopolar form while the second is bipolar in nature. The signals are however, predictable and consistent. The reason for this dissimilarity has been attributed to interactive flux within the metal yoke.

The transmitter cores may be 400 Hz (0.004 inches laminate thickness) 'C' cores wound with 36 or 34 swg enamelled wire.

An evaluation of transmitter cores with various amp-turn values is shown in graph form, FIG. 4. The detector, detector height and plate position were held constant throughout the tests. One, one millisecond pulse applied to the coil produces a peak current with a value dependent on wire resistance, distance from plate and system time constants. A circular metal plate fixed on a rotary rig has a magnetic dipole induced into a localised region on its surface by the transmitter coil, whose height above the plate can be altered.

The moment the transmitter coil is pulsed flux builds up in the metal core. When the core is in contact with the metal plate the majority of the flux passes through the plate, the result being the imprinting of a dipole. As the transmitter core is lifted off the metal plate there is an available path for lines of flux across the leakage gap between the poles of the transmitter core. The higher the lift off the greater the total reluctance in the magnetic circuit, the greater the tendancy for flux to leak across the gap, so the weaker the imprinted dipole. Once the pulse has been applied the plate is set in motion and the induced dipole detected by the detector. The signal from the two pairs of diodes on the detector are displayed on a UV record and an arbitiary value for signal strength determined from the average peak-to-peak values of the two signals over five repetition cycles (The dipole remains in the plate with the same strength for an unlimited period).

Figure 4A:
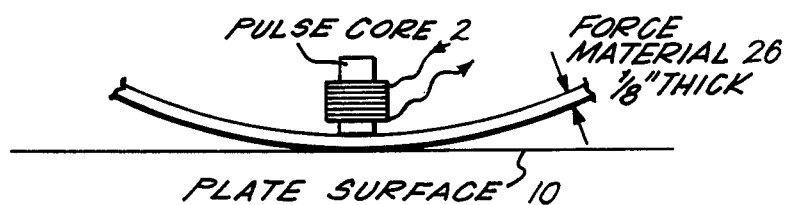
FIG. 4a illustrates the mounting of a pulse core on the force material and the relationship of those elements to a plate surface for implanting a magnetic dipole on the plate surface.

With a lift off height of up to approximately ⅛" from the plate surface the impedance of the coil changes, the result being an increase in current with lift off up to the final saturation peak current which remains constant over ⅛" lift off. The mounting of the transmitter or pulse core 2 on a force material 26 to provide a ⅛" lift-off from plate surface 10 is shown in FIG. 4a.

As can be seen from FIG. 4 the characteristic shape for lift off against signal strength is a high peak (off the graph) at zero lift off followed by a well leading to a secondary hump at approximately ⅛" lift off. Signal strengths are not indicated for values below 1/16" lift off due to the difficulties in maintaining the required gap size.

The build up of current in the coil is exponential. If, however, a square current waveform is assumed, then the average power is given by:

$$VI_{T}t(on) \qquad (1)$$

where
V = system voltage
I = coil current
t(on) = time pulse applied
T = repetition period The period, with a distance of 1 foot between transmitter and detector and at a velocity of 15 ft/sec is:

1/15 = 66.67 ms

The average power delivered by the source is given by (1). Therefore 2.75×(1/66.67) = 0.607 watts.

This value is obviously dependent on the period, which is governed by the velocity of the system and by the spacing between transmitter and detector.

It is not essential to inject energy into the pulsing system each time a dipole is detected. "N" detectors set at fixed distances from the transmitter can be used to divide the power consumed by N. If 'N' takes the value of '2', the first detector detects the dipole and indicates this fact, the velocity or distance being determinable from the time taken or distance travelled between the transmitter and first detector. The dipole remains in the pipe wall and a further value for velocity or distance is determined from the time taken or distance travelled between the first detector and the second. The system repulses on acknowledgement from the second detector that a dipole has been recognised. It does not matter to the nth detector whether the n−1th component is a transmitter imprinting a new dipole previously imprinted. It has the advantage of reduced power consumption but the error reduction system will need to be more complex.

Using as a standard transmission core the 1st 'C' core with dimensions as indicated in Table 1, the frequency bandwidth for 0.5 to 15 ft/sec is approx 10 to 400 Hz. These frequencies reduce the larger the core length.

TABLE 1

| Core* | DIMENSIONS IN INCHES | | | | |
|---|---|---|---|---|---|
| | A | B | C | D | E |
| 1st | ¾ | ¼ | ¼ | ¼ | ½ |
| 2nd | 1¼ | ⅜ | ½ | ⅜ | 1 |
| 2nd Stripped | ⅞ | ⅜ | ¼ | 3/16 | ¾ |
| 3rd | 1 9/16 | ⅜ | ¼ | ⅜ | 1 9/16 |

*See FIG. 1 for spatial arrangements of parameters A-E

Figure 5:
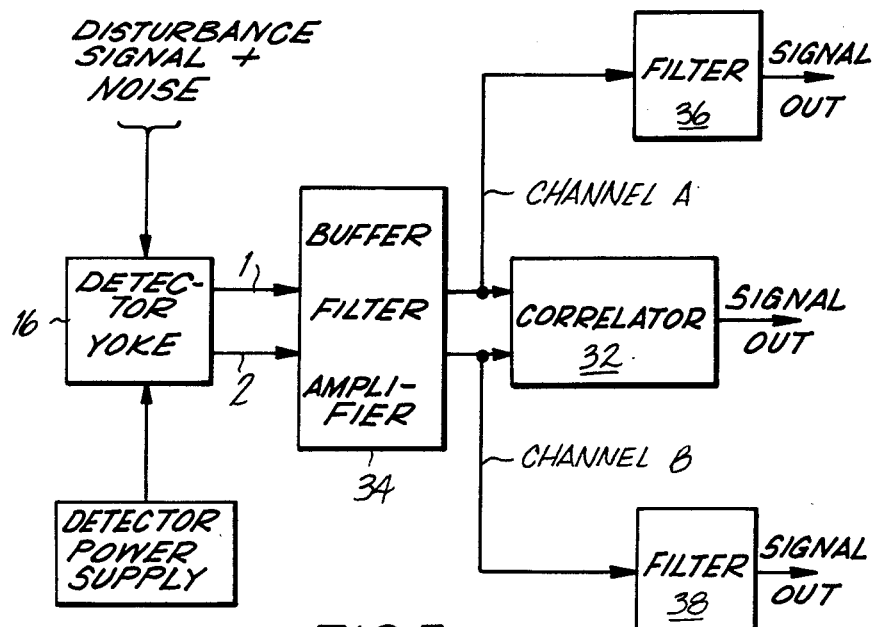
FIG. 5 illustrates a spatial correlator circuit for enhancing the signal-to-noise ratio of the detector signal component.
Figure 6:
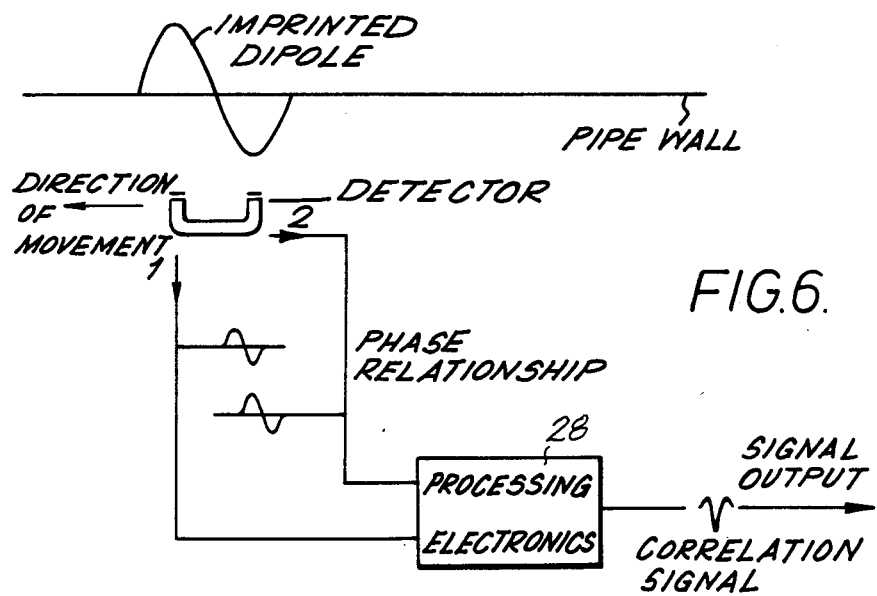
FIG. 6 illustrates the phase relationship between the detectors mounted on each arm of a detector yoke.

The detector will transmit to the processing electronics 28 (FIG. 6) a function containing the required signal plus noise (FIG. 5). The noise can be assumed random and containing all frequencies to the upper frequency limit of the diode detectors. The signal component is predictable in character and lies within preset frequency limits determined by core limb spacing and vehicle speed. To enhance a signal-to-noise ratio the redundant signal levels, i.e. high and low frequency noise, can be eliminated by direct filtering by buffer-filter-amplifier 30. Both signals 1, 2 from the detector head are band limited in this way and fed into the electronic side of the spacial correlator 32, FIG. 5. As the detector yoke 16 passes over the imprinted dipole a signal is transmitted by each limb, the difference in the two signals being their phase relationship, FIG. 6. The correlation section subtracts the two channel signals, removing a large proportion of synchronous noise and increasing the signal strength by the sum of the opposite peak values, the result being further increase in signal-to-noise ratio. The processing electronics circuit 28 of FIG. 6 includes buffer-filter-amplifier circuit 34, correlator circuit 32 and filters 36 and 38 of FIG. 5.

It is important for the detector system to be able to distinguish between a dipole and other magnetic disturbances in the area. The methods used so far to try and ensure a minimum error detection rate are spatial correlation and band limiting. Spatial correlation is the result of the diode separation on the detector yoke matching the spacial geometry of the imprinted dipole. Only in a matched condition will a peak signal level result. It is believed therefore, that small magnetised defects will pass through undetected unless their magnetisation strength is much higher than that of the dipole. If the two signals 1,2 from the detector bridge are monitored at the moment of match, one will have a positive peak value and the other a negative peak value. Use could therefore, be made of the 'AND' function to improve on noise immunity. The positive/negative condition should only prevail for signal dipoles unless an error defect matches the dipole configuration.

It has been observed that phenomena such as welds, flanges, etc, produced an output much greater than signal amplitudes. It is very easy to compensate for these abnormal signal strengths by windowing the signal input from the detector head and only allowing signals within set amplitude levels to be considered as control characters.

The time domain characteristics of the system are also predictable and can be used in an error minimisation system. It is possible that the system at some time will not detect an imprinted dipole. In the event of this happening, an error is introduced in the velocity/distance measurement. This error can be reduced to a minimum by:

(a) monitoring the velocity of the system and using this to control an automatic repulse unit. This unit will imprint a new dipole after a set time, the time limit set according to velocity. This unit has been termed a 'flywheel' system.

(b) In the same way as using a maximum time control variable in which to reprint, a minimum time control variable can be used to ensure that premature noise signals are not mistaken as control characters. A basic system for windowing and setting minimum and maximum time variables is outlined in FIG. 7.

A number of pull through tests were carried out using on board power supplies delivering 2.75 amps at 15 volts. The free running pulse system fed the '1st' transmitter core wound with 200 turns of 36 swg enamelled wire (Table 1), dipoles being detected with the third detector head, FIG. 2. The shoes were positioned approximately 1½ feet apart. The detector and transmitter cores were potted in brass shoes with 'ferrobestos' face material which is non-conducting and, therefore, limits the possibilities of pulse distortion due to eddy currents. Care should be taken to ensure accurate alignment of transmitter and detector when mounted on the carrier vehicle since mis-alignment by ±100% of the transmitter core limb width would seriously degrade the detected signal. Output signals are transmitted along coaxial cables into an amplification panel and subsequently recorded on both UV and magnetic tape. It is obvious from recorded tests that flanges and welds can be easily detected and using a suitable amplitude window function can be eliminated. It is a necessity for the same reason to limit the gain of the output signal. Initially the signal was amplified into saturation and it proved very difficult to differentiate flanges and welds from signals at certain points.

Short regions of reduced signal strength or loss of signal have been attributed to twisting of the vehicle in the pipe due to torsional force exerted by the umbilical cable. The vehicle did change orientation during its passage down the line. A simple weight fixed and hung at right angles to a potentiometer spindle can be used to monitor changes. A proportion of the voltage applied across the potentiometer is tapped by the slide according to angular position of the potentiometer spindle. The shoe path can then be determined quite accurately.

No signal can be recorded over voltage saturation areas such as welds or flanges, but if a signal is required to pass over a weld or flange it should be possible to either straddle the area with two systems or to use the saturation of a weld or flange as a starting point marker for each length. The methods used are totally dependent on the resolution and accuracy required.

Figure 8:
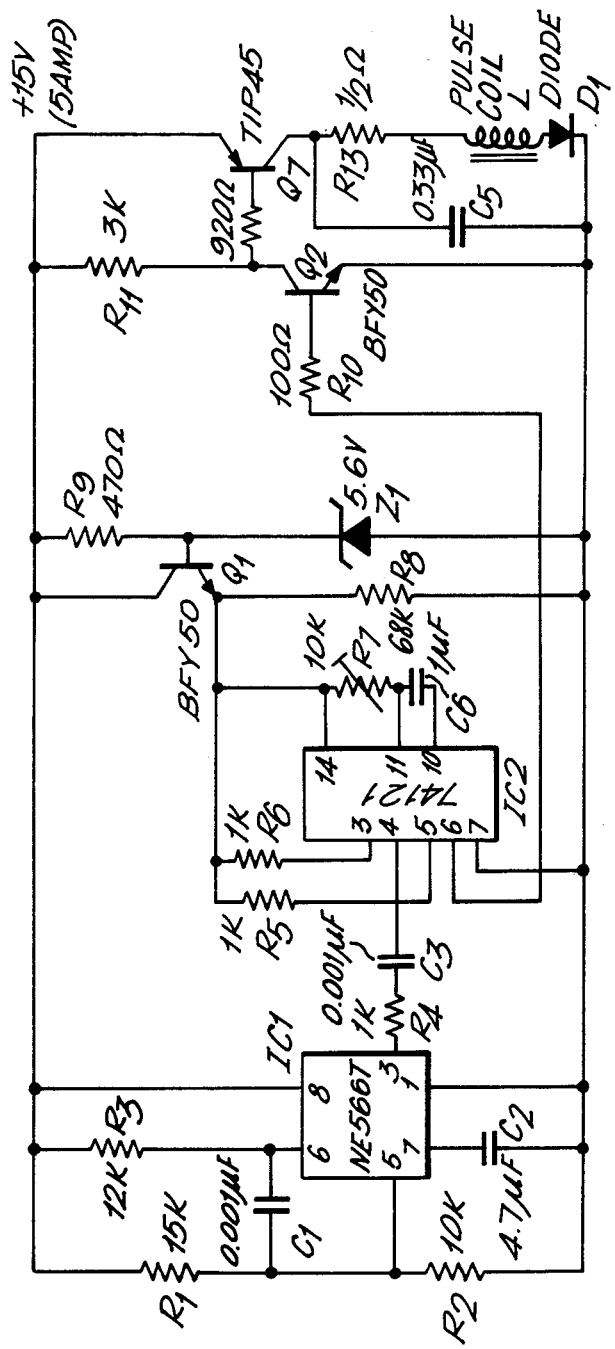
FIG. 8 is a circuit diagram of a pulsing system for exciting a transmitter coil in a tranmitter of the inventive apparatus.

The pulsing system as used on pull through tests is shown in FIG. 8. The NE566T is a function generator capable of producing a square wave output on pin 3, the frequency of which is dependent on the values of $R_3C_2$. This signal is differentiated and fed to pin 4 of the 74121 monostable flip-flop producing a fixed duration pulse on pin 6, the duration being set by $R_7$. The pulse is fed to the base of $Q_2$ turning it on, lowering its collector voltage to Vce (sat). This sends the Darlington transistor $Q_7$ into saturation raising its collector voltage to 15-$Q_7$ Vce (sat) volts enabling a current pulse of approximately 1 ms duration to pass through the transmitter pulse coil L. The diode D, is included to limit overshoot in the current waveform and $C_5$ to reduce the time constant of the transmission waveform.

The time domain characteristics of the velocity/distance measurement system are well defined for specific velocity limits. It should, therefore, be possible to limit error triggering with a preset or variable timing system.

Figure 7:
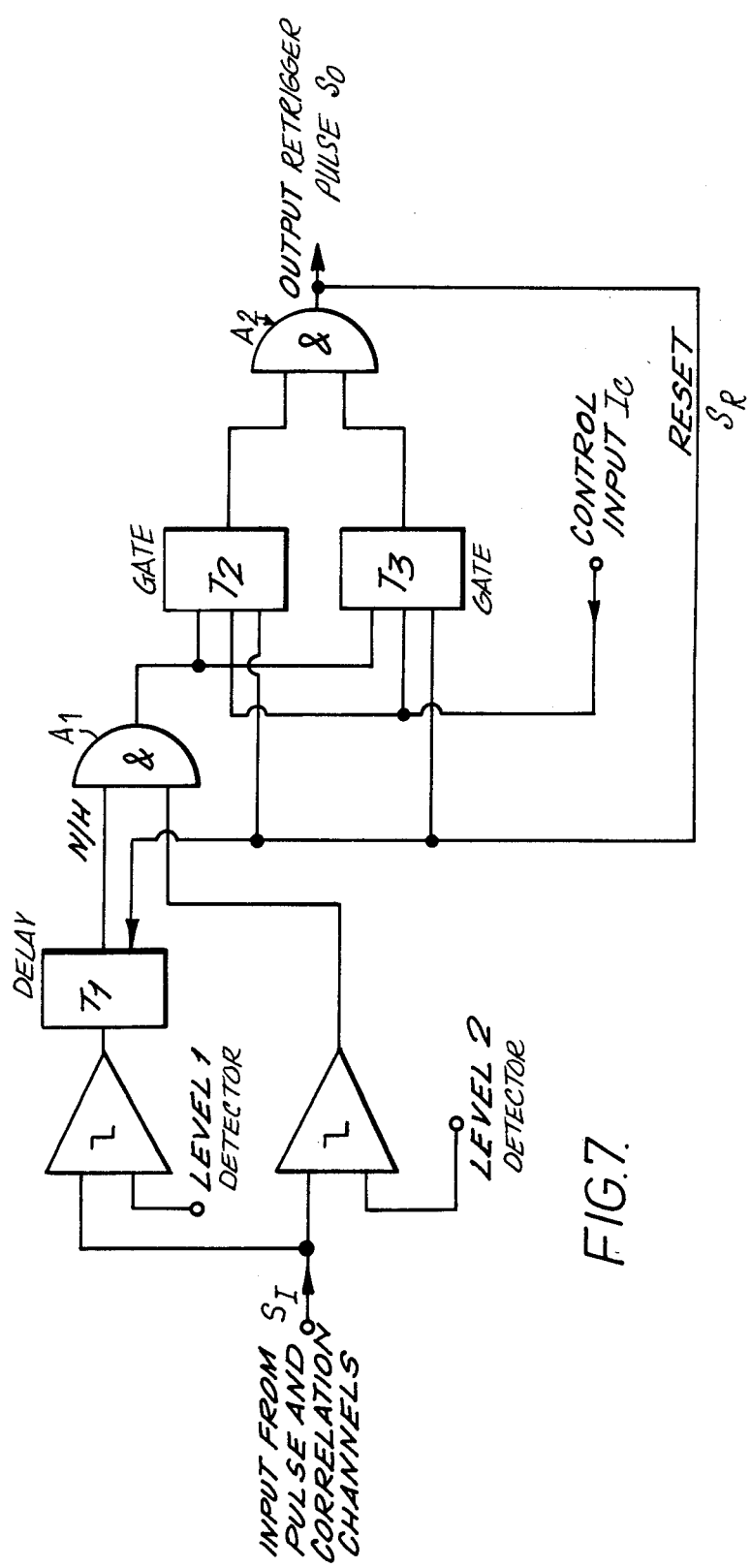
FIG. 7 is a block diagram of logic circuitry for setting minimum and maximum time variables to provide a window for detection of an implanted dipole.

The following is a description of the basic system shown in FIG. 7 for windowing and setting minimum and maximum time variable for reducing potential errors in the velocity/distance measurements.

A signal input S, from the pulse and correlation channels passes through level detectors 1 and 2, with the output of level detector 1 being delayed by delay circuit $T_1$. The delayed output of delay circuit $T_1$, along with the output of level detector circuit 2, are input to AND gate $A_1$. A timing cycle for gates $T_2$ and $T_3$, which can be set according to a control signal $I_C$ from a velocity circuit (not shown), is initiated by reset signal $S_R$ from the output of AND gate $A_2$. The outputs from gates $T_2$ and $T_3$ govern the period over which an input signal $S_I$ from the correlation circuit can be used as a control signal. If $T_3$ is the end limit timing shutter then at the end of its timing cycle a retrigger pulse output $S_o$ for a repulse will automatically be given.

Level 1 and 2 form the amplitude limits of the window function, where the function is zero for all values of input signal outside the window limits.

Figure 9:
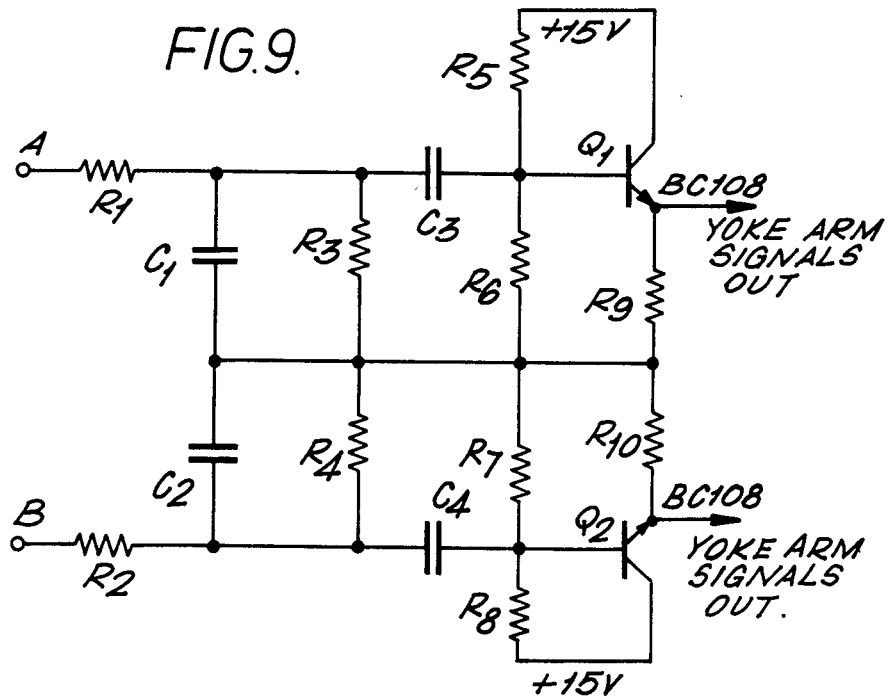
FIG. 9 shows an exemplary embodiment of the buffer-filter amplifier circuit of FIG. 5.

The yoke signal is buffered by $Q_1$, FIG. 9, and fed to the high pass filter stage $C_1$, $R_3$ giving a transfer function $$\frac{SC_1R_3}{R_3SC_1 +} \text{ with a 3dB asymptote at:}$$

$$\frac{1}{R_3C_1} = W_{C_1}$$

The signal is amplified by $A_1$ with a gain of $-R_5/R_3$, this feeds a low pass network formed by $R_7$, $C_3$. $C_3$ being effectively shunted by $R_9$, the input impedance of the correlation unit. It should be noted that the second channel sees an effective shunt impedance of twice the resistance, $R_9$, hence the capacitance value of $C_4$ must be half the value of $C_3$ to maintain symmetry in the processing system.

The response of the low pass network is:

$$\frac{R_9}{R_7 + R_9}\left(\frac{1}{\frac{R_7R_9SC_3}{R_7+R_9}+1}\right) \text{ with a 3dB asymptote:}$$

$$\frac{R_7 + R_9}{R_7R_9C_3} = W_{C_1}$$

The correlation section consists of $A_3$, $R_9$, $R_{12}$, $R_{10}$, $R_{11}$.

$$V_{out} = -V_1 \cdot \left(\frac{R_{12}}{R_9}\right) + V_2 \cdot \left(\frac{R_{10}}{R_{10} + R_{11}}\right) \cdot \left(\frac{R_9 + R_{12}}{R_9}\right)$$

If $R_{12} = R_9 = R_{10} = R_{11}$

Channels A and B are buffered before connecting to the line drivers. The correlation unit subtracts the out of phase signals to produce the correlation signal.

Extra filtering was added to the two detector yoke output signals to limit noise and assist in driving the recording units.

Figure 10:
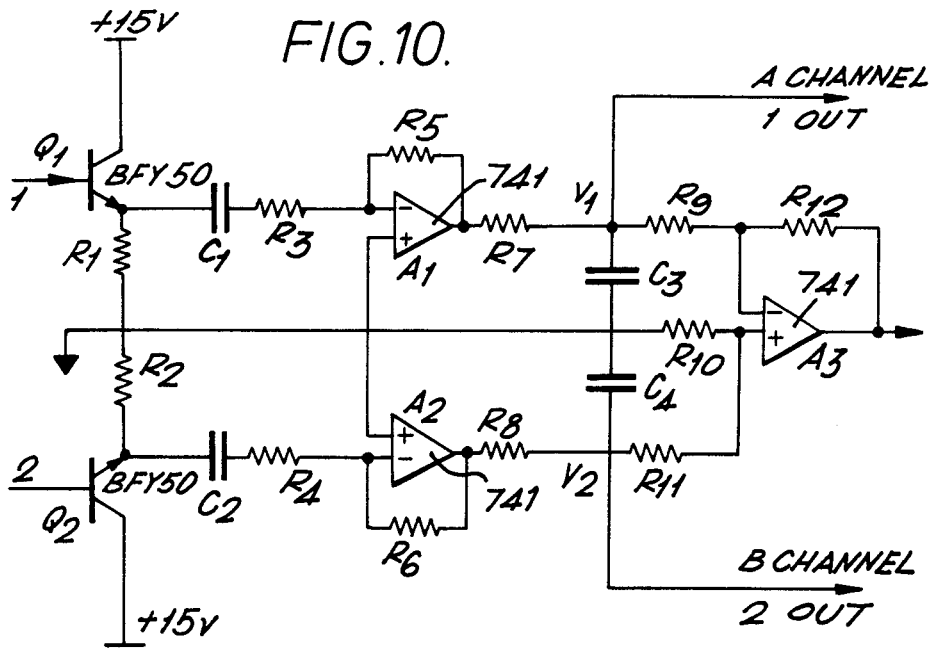
FIG. 10 shows an exemplary embodiment of the filter circuitry for each of the filter channels and the correlator circuit shown in FIG. 5.

FIG. 10 shows the complete two channel unit. The input impedance of transistor $Q_1$, in the emitter follower mode is given by:

$$Z_{in} = \frac{R_5 R_6}{R_5 + R_6} \parallel [hic + Re(1 + hfe)]$$

and since $$Re(1 + hfe) >> hic >> \frac{R_5 R_6}{R_5 + R_6}$$

The filter network is effectively shunted by $$\frac{R_5 R_6}{R_5 + R_6}.$$

The network resistor $R_6$ will in effect be $R_6 // R_5$, but for case of notation will be called only $R_6$.

The network transfer function is given by:

$$V_{in} = \frac{R_1 V_{out}}{R'_6} + \frac{R_1}{R_3}\left\{V_{out}\left(1 + \frac{1}{R'_6 SC_3}\right)(SR_3C_1 + 1) + V_{out}\left(1 + \frac{1}{R'_6 SC_3}\right)\right\}$$

with $$\frac{V_{out}}{V_{in}} = \frac{SR_6' R_3 C_3}{R_1(R_6'SC_3 + 1)(R_3SC_1 + 1) + R_6'SC_3 + R_1 SC_3 + 1}$$

$$= \frac{SR_6' R_3 C_3}{S^2 R_1 R_6' R_3 C_3 C_1 + S(R_1 R_6' C_3 + R_1 R_3 C_1 + R_6' C_3 + R_1 C_3) + (R_1 + 1)}$$

which is band pass in form with poles at:

$$\frac{(R_1 R'_6 C_3 + R_1 R_3 C_1 + R_6' R_1 + R_1 C_3)}{2 R_1 R_6' R_3 C_3 C_1} +$$

$$\sqrt{(R_1 R_6' C_3 + R_1 R_3 C_1 + R'_6 R_3 + R_1 C_3)^2 - \frac{R_1 + 1}{R_1 R_6' R_3 C_3}}$$

I claim:

1. Apparataus mounted on a vehicle for measuring velocity and/or distance travelled by the vehicle on a ferromagnetic surface, comprising:
   means for transmitting including a transmitter core with at least two spaced transmitter faces for implanting spaced magnetic dipoles with a given spatial geometry on said ferromagentic surface;
   means for detecting located on said vehicle at a given distance remote from said means for transmitting for generating detection signals upon detection of said implanted magnetic dipoles, and including an electrical bridge comprising at least two magnetic sensing means connected in respective arms of said bridge, the spatial separation of said at least two magnetic sensing means corresponding with the spatial geometry of said at least two spaced transmitter faces;
   means for triggering said means for transmitting in response to said detection signals to implant a magnetic dipole in said ferromagnetic surface; and
   means for processing said detection signals to provide corresponding output signals with each output signal being a function of the time elapsed between the implantation of one of said magnetic dipoles and the detection of said one magnetic dipole, and said processing means including a discrimination circuit for processing detection signals having a predetermined characteristic.

2. Apparatus as claimed in claim 1, wherein said detecting means includes separate magnetic sensing means to generate output signals for said triggering means and for said processing means.

3. Apparatus as claimed in claim 1, wherein said detecting means further comprises a U-shaped magnetic yoke with the free ends thereof forming respective first and second limbs, and said at least two said magnetic sensing means being attached in spaced relationship to one another to each of said first and second limbs, said magnetic sensing means being electrically connected to form said electrical bridge configuration.

4. Apparatus as claimed in claim 3, wherein the spatial separation of said first and second limbs and the spaced relationship of said at least two magnetic sensing means are correlated with the spatial geometry of said at least two spaced transmitter faces.

5. Apparatus as claimed in claim 1, wherein said triggering means causes said transmitting means to implant a magnetic dipole in said ferromagnetic surface of each said detection signal.

6. Apparatus as claimed in claim 1, wherein said characteristic is bounded by a window.

7. Apparatus as claimed in claim 6, wherein said predetermined characteristic is amplitude and said window is a predetermined amplitude band of said detection signals.

8. Apparatus as claimed in claim 6, wherein said predetermined characteristic is time and said window is formed by a minimum and maximum time for receipt of each of said detection signals.

9. Apparatus as claimed in any one of claims 1, 2, 3, 4, 5, 6, 7 or 8, wherein said magnetic sensing means are magnetic diodes.

* * * * *